US006473453B1

(12) United States Patent
Wilkinson (10) Patent No.: US 6,473,453 B1
(45) Date of Patent: Oct. 29, 2002

(54) HIGH DATA RATE MULTIPLEXED MULTICHANNEL HIGH FREQUENCY BROADCAST SYSTEM

(75) Inventor: Robert G. Wilkinson, Portsmouth (GB)

(73) Assignee: The Secretary of State for Defence in Her Brittanic Majesty's Government of the United Kingdom of Great Britain and Northern Ireland, London (GB)

(*) Notice: Subject to any disclaimer, the term of this patent is extended or adjusted under 35 U.S.C. 154(b) by 0 days.

(21) Appl. No.: 07/953,278

(22) Filed: Sep. 30, 1992

Related U.S. Application Data

(63) Continuation of application No. 07/563,917, filed on Jun. 25, 1990, now abandoned.

(51) Int. Cl.[7] .......................... H04B 1/707; H04B 1/69
(52) U.S. Cl. .................. 375/143; 375/130; 375/140; 375/141; 375/146; 375/147; 375/152
(58) Field of Search ................... 375/1, 60, 96, 375/99, 100, 130–153; 370/18, 19, 23, 315, 316, 319, 320, 328, 329, 335, 342, 441; 380/34

(56) References Cited

U.S. PATENT DOCUMENTS 3,484,554 A * 12/1969 Gutleber .................... 370/19 X
3,715,508 A *  2/1973 Blasbalg .................... 370/19
4,470,138 A *  9/1984 Gutleber .................... 370/18

OTHER PUBLICATIONS

IEEE 1985 Ultrasonics Symposium Proceedings: vol. 1, pp. 108–113 J. Gevargiz et al "Implementation of a 200 MHz Transform Domain Processing Spread Spectrum Receiver with Narrow–Band Adaptive Interference Exciser".

IEEE 1980 Ultrasonics Symposium Proceedings: vol. 1.1, pp. 488–491 J.N. Lee et al "High Speed Adaptive Filtering and Reconstruction of Broad–Band Signals Using Acousto–Optic Techniques".

British Search Report, Sep. 25, 1990.

H.F. Harmuth, "On the Transmission of Information by Orthogonal Time Functions"; (AIEE Paper 59–1076; Jul., 1960; 370/19).*

* cited by examiner

*Primary Examiner*—Bernarr E. Gregory
(74) *Attorney, Agent, or Firm*—Nixon & Vanderhye P.C.

(57) ABSTRACT

A high frequency communications system comprises eight multiplexed (112) spread spectrum channels with data in each channel transmitted using, for example, 32 semi-orthogonal codes to enable 5 bits of data to be sent for every coded symbol transmitted. The multiplexed data is connected to a phase shift key (PSK) modulator (117) to modulate an hf carrier. At the receiver, inband interference is removed by frequency excision (92, 128) or weighting, making use of the facts that the interference is generally narrow-band and the spectrum of the frequency components of the received signal should be symmetrical about the carrier frequency. The detected signal is Fourier transformed by an FFT processor (91) and then connected to an interference exciser (92, 128) where signal samples symmetrical about the carrier frequency are compared and any sample which exceeds the respective symmetrical sample by more than a predetermined threshold is excised or given a low weighting. After interference excision the remaining signal is connected to a bank (1210) of 32 cross-correlation detectors before connection to a maximum likelihood detector and decoder (1213).

23 Claims, 6 Drawing Sheets

HIGH DATA RATE MULTIPLEXED MULTICHANNEL HIGH FREQUENCY BROADCAST SYSTEM

This is a continuation of application Ser. No. 07/563,917, filed Jun. 25, 1990, now abandoned.

BACKGROUND OF THE INVENTION

1. Field of the Invention

The invention relates to high frequency communications and in particular to high data rates and parallel multichannel broadcasting.

2. Discussion of Prior Art

In a known multichannel hf broadcast system four parallel 75 baud telegraphy channels are operated. This system employs multichannel FEK (Frequency Exchange Key) modulation in a standard 3 kHz channel bandwidth. This system, however, has limited capacity and in order to increase capacity various proposals include increase of number of channels and an increase in transmitter power to 50 KW since it has been found that reception range falls off rapidly when the number of channels exceeds two or three. Satisfactory high speed serial modems have not yet been produced, however, use of these would still require transmitter power of at least 16 KW.

Whereas a single FEK channel signal is very efficient as an rf power source (in that the radio transmitter need only have the same peak power rating as the required mean power) a multichannel signal requires a radio transmitter which has a very high peak to mean power rating. For example, to radiate the same mean power per channel as a signal 1 kW FEK channel, an eight channel system will ideally require a transmitter having a means power of 8 kW but a peak rating of 64 kW. Signal conditioning can help to reduce this power ratio and therefore the peak power rating, by limiting the peak-to-mean ratio of the multichannel signal before it is transmitted. With special signal processing this ratio can be reduced to about 4 to 1, but this will still require a transmitter of 32 kW to transmit a mean signal power of only 8 kW. Without signal conditioning the radio transmitters will either produce severe harmonic and intermodulation interference, or at worse be damaged by peak power transients.

Serial data signals will not suffer from this particular problem because the peak-to-mean ratio is only about 3 dB (for PSK modulation). Nevertheless, the performance of present day serial modems will not be as good as multichannel FEK because long range multipath radio distortion and interference will produce considerable symbol distortion. Self-adaptive equalising serial modems will be able to overcome this problem in future, but a substantial signal-to-noise ratio (typically 18 dB) will be required to operate these systems properly to achieve an acceptable output error rate at the data rates required.

Serial modems also suffer from the disadvantage that any interference, including narrow-band carrier signals, will produce severe errors in all the data channels. This does not happen with multichannel FEK.

Long range radio communications can only be achieved using sky-wave propagation. This will support many propagating modes with time dispersions lasting several milliseconds. This produces severe inter-symbol interference and frequency selective fading across the band-width which hampers hf communication.

FEK modulation can sometimes operate in these conditions because the transmitted symbol is normally much longer (13 ms at 75 bauds) than the dispersion of the channel and the two FEK frequency tones can provide a degree of frequency diversity.

There will, however, be many occasions when this is insufficient to overcome prevailing multipath conditions and the output error rate becomes very poor despite having a very high signal-to-noise ratio.

In communications it is very important to take into account not only the peak-to-mean power ratio problem, but also the multipath distortion produced by HF sky-wave signals. This dispersion can be as high as 10 ms but it will be typically 8 ms and much less for nearly all but the very worst circuits.

SUMMARY OF THE INVENTION

Spread spectrum signals are very effective in counteracting multipath distortion because cross-correlation matched filter detection can be used to despread the received signal and simultaneously resolve the separate multipath components. Inter-symbol interference can therefore be avoided when spreading codes are used if the block length (the symbol period) is made longer than the total dispersal time for the signal path.

Inband interference, however, can obliterate an otherwise good data signal in any communications system. The inventor has found that interference in the hf band is generally narrow-band and usually less than 200 Hz.

The object of the invention is to provide a multichannel hf broadcast system with improved performance compared with the known systems.

The invention provides:

a multichannel high frequency (hf) communications system comprising a spread spectrum signal transmitter including:
 a) means to encode a message signal by selection of at least one of a preselected number of semi-orthogonal binary codes;
 b) means to modulate a hf carrier wave with the encoded signal; and
 c) means to transmit the modulated hf signal;
and a receiver including:
 a) means to detect the received modulated hf signal;
 b) means to Fourier transform the received signal using a fast Fourier Transform (FFT) processor;
 c) means to test for an excise any narrow frequency band interference; and
 d) cross-correlation matched filter detection means to decode the Fourier transformed signal to derive the original message signal.

Pseudo-orthogonal codes are well known in the art, having a high impulsive autocorrelation function and low cross correlation function. Since the spectrum modulation results in the frequency spread of the wanted signal being greater than the frequency spread of typical interference, it is possible to excise interference to improve the communications.

The interference excision means preferably comprises means to compare signal frequency components symmetrically placed with respect to the carrier frequency and to excise any such component whose amplitude exceeds the amplitude of the respective symmetrical component by more than a predetermined limit.

Alternatively the interference excision means comprises means to compare signal frequency components symmetrically placed with respect to the carrier frequency and to assign a low weight to any such component whose amplitude exceeds the amplitude of the respective symmetrical component by more than a predetermined limit.

The threshold for interference excision can be made adjustable to maximise system performance. Phase information on symmetrically compared signal frequency components can also be used for interference excision.

In an advantageous arrangement the transmitter includes a data multiplexer capable of multiplexing a number of parallel data channels, the multiplexer being connected to the input of the encoding means. Advantageously channel synchronisation, data control and checking information is added to the multiplexed data connected to the encoding means.

In a particular form of the invention the coded data is low pass filtered and then connected to a PSK modulator to modulate a sub-carrier signal of the same frequency as the output bit rate from the encoding means. Preferably the low pass filter is an impulsive response Kaiser Bessel filter.

In the preferred arrangement the receiver includes means to correct the received signals for Doppler frequency shift and to detect the sub-carrier signal. The matched filter detector preferably comprises synchronous detectors to which the sub-carrier signal is respectively connected in phase quadrature. Advantageously the synchronously detected signal is connected in parallel to a plurality of cross-correlation detectors, each cross-correlation detector having stored therein a respective one of the preselected number of Fourier transformed pseudo-orthogonal codes.

Preferably the outputs of each cross-correlation detector is connected to a comparator circuit which identifies and decodes the most likely detected code by measurement of the largest cross-correlator output signal.

BRIEF DESCRIPTION OF THE DRAWINGS

The invention will now be described by way of example only with reference to the accompanying Drawings of which.

DETAILED DISCUSSION OF PREFERRED EMBODIMENTS

Figure 1:
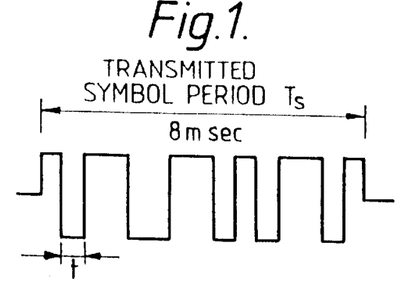
FIG. 1 illustrates a spread spectrum code.
Figure 2:
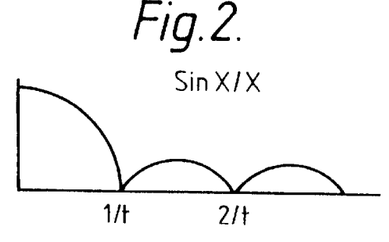
FIG. 2 is a frequency spectrum of a signal modulated by a spreading code.
Figure 3:
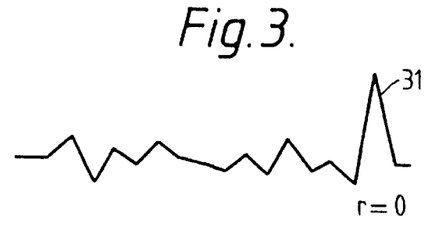
FIG. 3 is a graphical representation of the autocorrelation function of a spreading code.

As Shown in FIGS. 1 and 2 a spreading code with a symbol period $T_s$ and a bit rate 1/t leads to characteristic frequency spectrum of the form six X/X with nulls at frequencies 1/t, 2/t etc. If a family of 32 pseudo-orthogonal pseudo-random codes is sued then the cross correlation of any one code sequence with any one of the other code sequences is substantially zero. The autocorrelation function of any one code, i.e. correlating the code with a replica of the code, as shown in FIG. 3 is substantially zero everywhere except at 31 when the two codes are in register. Use of a family of 32 pseudo-orthogonal codes can b made in a communications system such that 5 bits of information can be transmitted for each spread code symbol. Use of 32 appropriate code detectors enables the transmitted signal to be demodulated.

Figure 4:
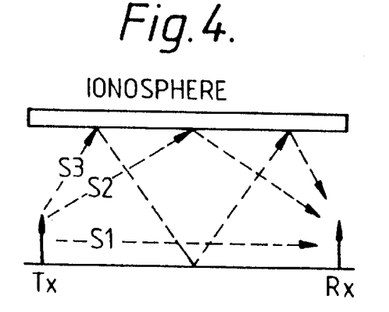
FIG. 4 is a schematic representation of hf transmission modes between a transmitter and a receiver.
Figure 5:
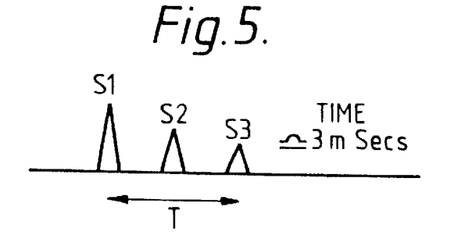
FIG. 5 illustrates the impulse response of a receiver channel to the transmission modes of FIG. 4.
Figure 6:
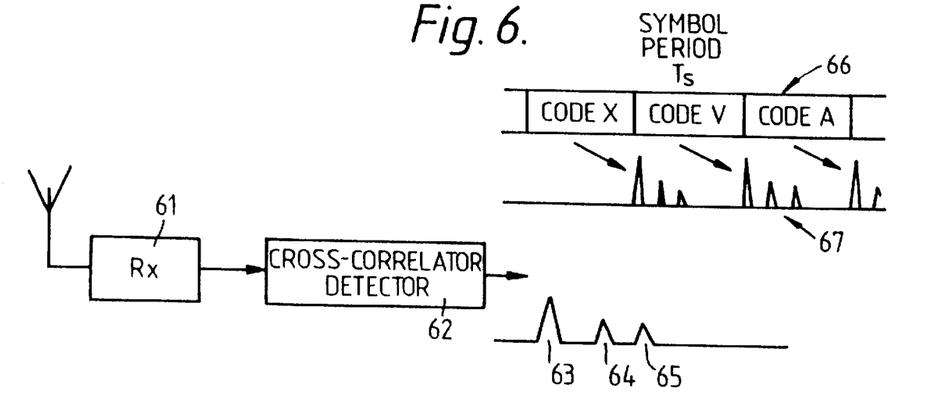
FIG. 6 is a simplified block diagram of a spreading code receiver.

FIG. 4 illustrates how skywave hf signals $S_2$ and $S_3$ from a transmitter Tx add to the groundwave signal $S_1$ to produce multipath distortion at a receiver Rx. The idealised received signal (FIG. 5) has components $S_1$, $S_2$ and $S_3$ spread over a response time T approximately equal to 3 millisecs. When a Phase Shift Key (PSK) modulated signal is used the receiver system indicated in FIG. 6 including a receiver PSK demodulator 61 and cross correlator spread code detectors 62 is able to resolve the three components 63–65. Where the received signal includes coded data corresponding to X, V, A as indicated by the receiver code block 66 the output from the code detectors 62 shows peaks 63–65 corresponding to each element of the coded data as shown by the detector output 67.

Figure 7:
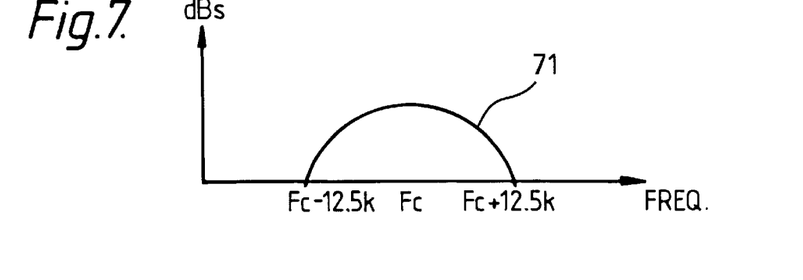
FIG. 7 illustrates the transmitted spectrum of band-limited PSK modulation.
Figure 8:
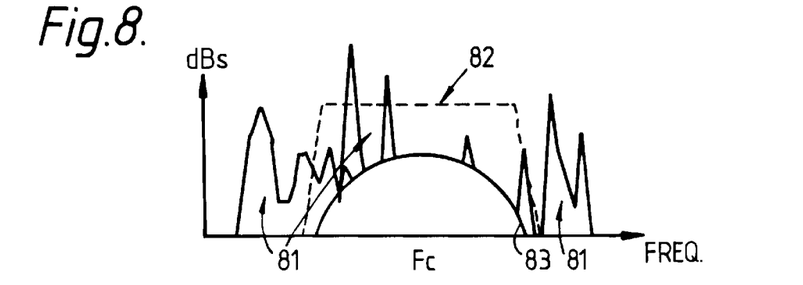
FIG. 8 illustrates a received FIG. 7 signal spectrum with superimposed representations of the transmitter frequency spectrum and the receiver bandwidth.

The principal of operation of the present invention is illustrated in FIGS. 7–10. The coded signal is transmitted via a band limited PSK modulator such that the transmitted frequency spectrum 71 is symmetrical about the carrier frequency Fc as shown in FIG. 7. The graph corresponds to use of a 100 bit spread spectrum code at a transmission rate of 12.5 k bits/sec, by way of example. If 32 pseudo-orthogonal codes are used then 5 bits of data can be received for every coded symbol transmitted. At 12.5 k bits/sec the symbol rate is 125/sec and the data throughput will therefore be 625 bits/sec. FIG. 8 shows the received spectrum with in-band interference signals 81. Some of the interference signals 81 fall outside the radio receiver bandwidth indicated by the dashed line 82. In the absence of interference the received spectrum should be symmetrical about the carrier frequency Fc as indicated by the solid curve 83. The invention utilises the fact that the frequency spread of the interferers is narrow compared with the signal and since the received spectrum should be symmetrical it is possible to excise the interference.

Figure 9:
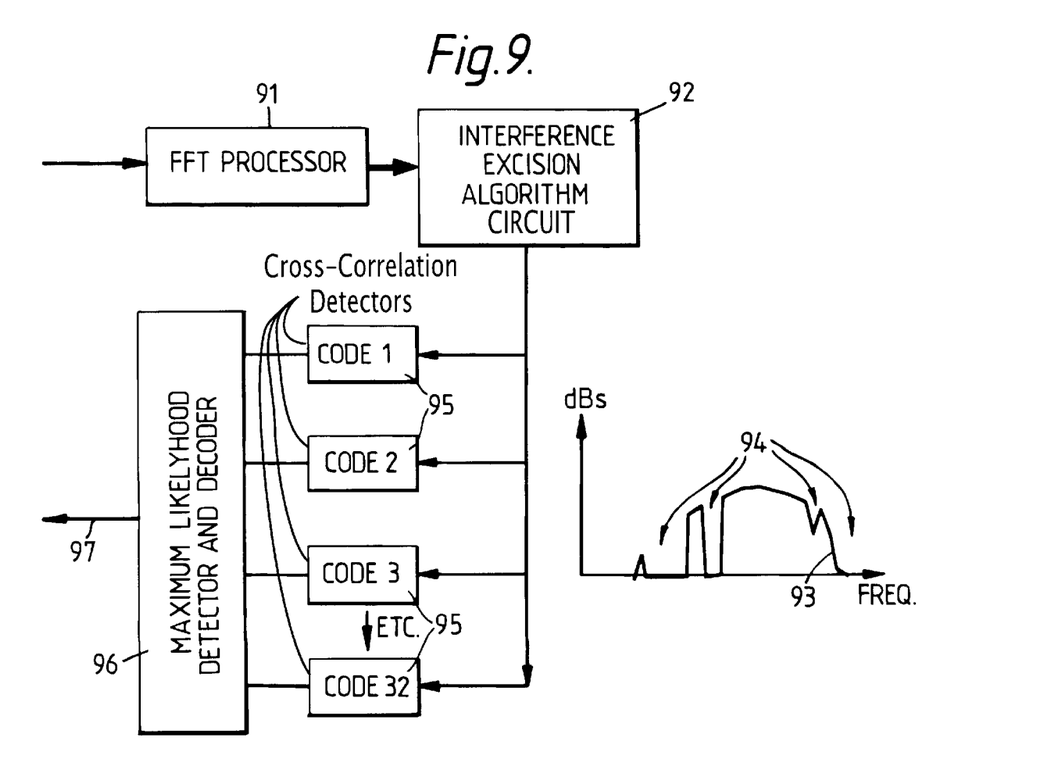
FIG. 9 is a block schematic diagram of the receiver interference exciser and decoder.

The received signal, after RF demodulation, is connected to a fast Fourier Transform (FFT) processor 91 as shown in FIG. 9. The FFT processor 91 output is then connected to Interference Excision algorithm circuit 92 incorporating an interference excision algorithm. In this circuit the signal spectral components symmetrically placed about the carrier frequency Fc are compared and if sufficiently dissimilar due to the presence of interference signal spikes 81, these interference frequencies are excised. The output frequency spectrum then appears as shown at 93 with gaps 94 at frequencies where interference signals 81 were detected (compare also 131 and 132 respectively). The Fourier transformed signal is then connected to thirty-two parallel cross-correlation detectors 95, with each detector holding a respective Fourier transformed one of the thirty-two pseudo-orthogonal codes. The cross-correlation outputs from the detectors 95 are connected to a further circuit 95 where the signals are compared and the most likely code (1–32) is selected (by way of example, by comparing the peak to mean of each signal and selecting the largest) then decoded and connected to the output 97 where the signal represents the 625 bits/sec data stream.

Spreading code signals can produce an acceptable detector output for received signal-to-noise ratios greater than −10 dB in a 25 kHz bandwidth. Known FEK modulation at 75 bits/sec produces a similar output error rate at −1 d in a 3 kHz bandwidth, equivalent to −10 dB in a 25 kHz bandwidth. For a given mean transmitter power, the present invention therefore produces about the same output error rate as the FEK system but the spreading code system can provide a data rate equivalent to eight 75 bits/sec FEK channels. Problems due to multipath transmission are less than for FEK modulation because the detector is a correlation matched filter. In this case the multipath signals can actually improve the error rate performance because the detector can use any or all of the received mode signals to determine the transmitted symbol. For example, if any one or two of the modes ($S_1$, $S_2$ and $S_3$) shown in FIG. 1 should fade then detection can be done using the remaining signal.

With a detection bandwidth of 25 kHz, the detector will be able to resolve multipath echoes as close as 100 $\mu$s. This will enable the modem to operate using radio frequencies which would normally produce flat fading across a 3 kHz receiver spectrum. Under these conditions a flat fade will produce irrecoverable errors in an FEK signal unless time interleaving or powerful EDAC coding is used.

Excision of interference signals as mentioned above can be achieved either by cancelling appropriate spectral regions or by weighting the spectral regions. Interference excision modifies the Fourier signature of the received code but the improvement obtained in signal-to-noise ratio outweighs any distortion produced in the detectors. In general, interference excision produces a signal-to-noise ratio improvement in excess of 10 dB.

Spread spectrum codes achieve the desired processing gain by increasing the Time-Bandwidth (TB) product. In the previous example the TB figure was 100 or 20 dB, because the symbol period was 8 ms and the code rate was 12.5 kHz. For smaller bandwidths the processing gain will be proportionally less, unless the symbol period is increased. In this case, the symbol period cannot be increased because it will reduce the data rate of the system. If the received signal must be contained within a 3 kHz bandwidth the maximum code rate can only be 1.5 kbits/sec, and the code length will only be 12 bits long. Codes of this length cannot be used for spreading because the desired autocorrelation and cross-correlation characteristics cannot be achieved. An alternative method is to use a higher code rate but band-limit the transmitted signal. This will limit the transmitted power to the desired bandwidth and achieve the processing gain but it will produce a transmitted signal with a peak-to-mean power ratio of 10 dB (10:1). This signal will require a transmitter with a peak power rating 10 times the mean transmitted power. This is therefore an unsuitable method. Alternatively, filtering can be done at the radio receiver. Although this will reduce the power level of the received signal it will actually improve the received signal-to-noise ratio because the signal level falls more slowly than the noise power as the detection bandwidth is reduced. For a 3 kHz receiver the noise will fall by 9 dB (25 kHz to 3 kHz) but the signal falls by only 7 dB. The signal-to-noise ratio will therefore improve by 2 dB. The processing gain will be 11 dB (1.5 kHz for 8 ms) so, after taking 10 dB of losses into account, the signal-to-noise ratio must be −1 dB for an acceptable error rate. This is reduced to −3 dB after correcting for the 2 dB of detection gain. This compares very closely with signal-to-noise ratio required for a signal FEK channel.

Figure 10:
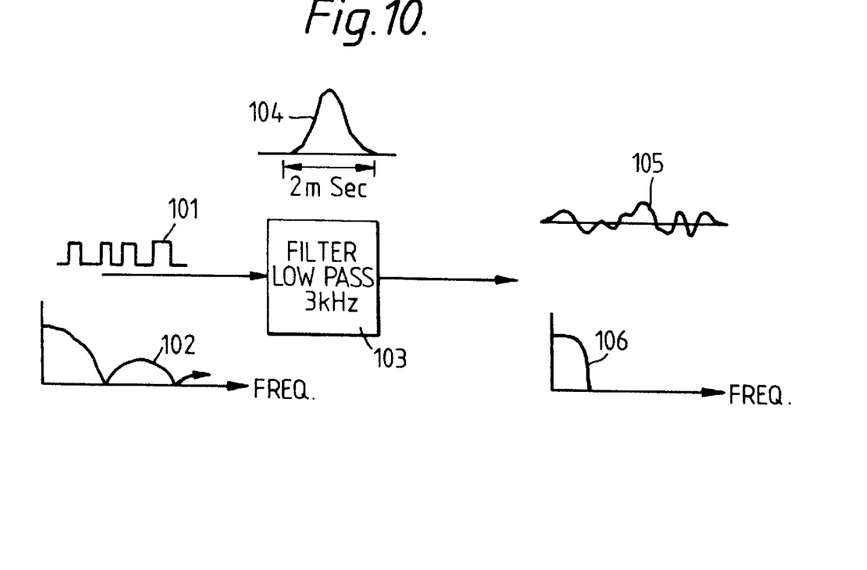
FIG. 10 illustrates the effect of a lowpass impulse filter in the FIG. 11 transmitter on the output frequency spectrum.

FIG. 10 shows the effect of low pass filtering the spreading code (FIG. 1) on the frequency spectrum (FIG. 2). The input code signal 101 has an input spectrum 102 with a peak to mean power of 3 dBs and a first zero at 12.5 kHz. This is connected to a 3 kHz impulsive response Kaiser Bessel low pass filter 103 as indicated at 104. The filtered output signal 105 has a frequency spectrum 106 with a higher peak to mean ratio of 10 dBs.

Figure 11:
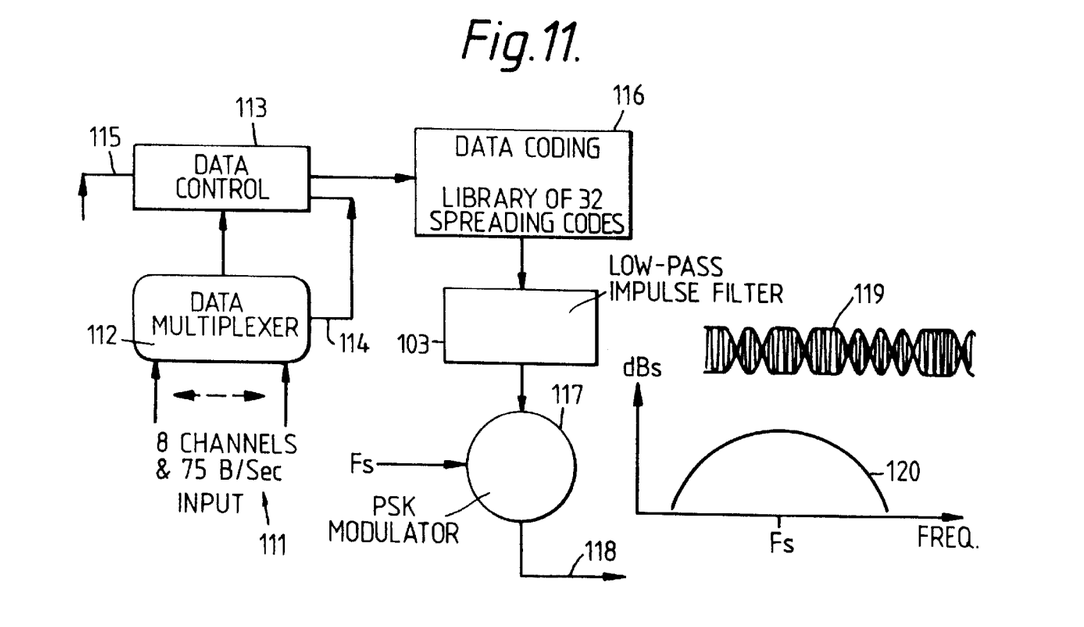
FIGS. 11 and 12 are schematic block diagrams of a transmitter and receiver according to the invention.
Figure 12:
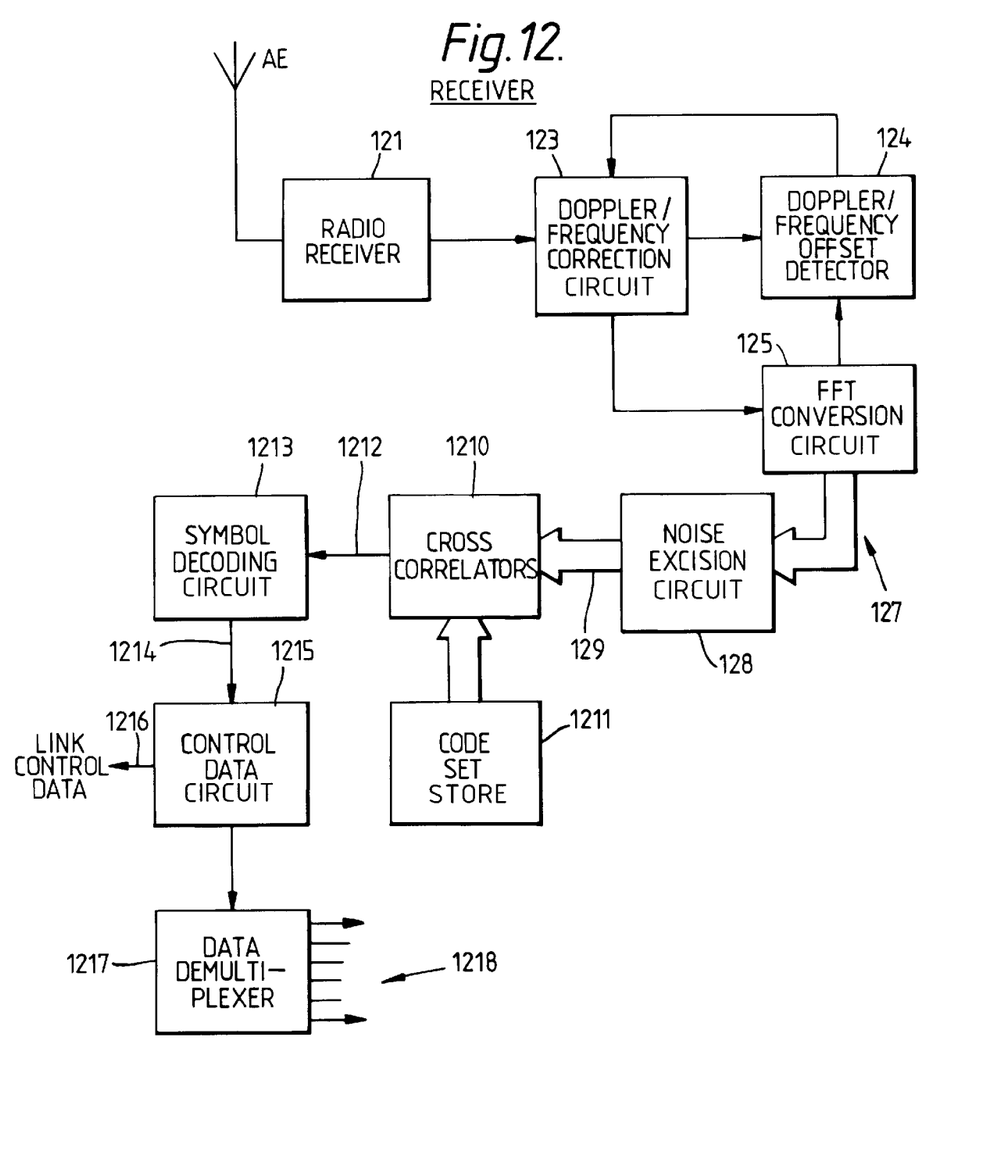

A more detailed transmitter/receiver arrangement is shown in FIGS. 11 and 12. Eight parallel 75 bits/sec channels 111 are multiplexed (112) then series connected to a data control 113. Link control signals are provided at a further input 115 to the data control. A total of 25 bits/sec is available for channel synchronization and other data control/checking functions. The 625 bits/sec output from the data control 113 is connected to a data coding circuit 116 which includes a library of (say) thirty-two 100 bit spreading codes, each having an impulsive autocorrelation function. The spread-coded data is connected at 12.5 kbits/sec (125 codes/sec) via the low pass impulsive filter 103 (as in FIG. 10) to a PSK modulator 117. The PSK modulator has a 12.5 kHz frequency sub-carrier input signal $F_s$ and the base band output signal is connected via line 118 to a USB radio frequency driver (not shown). The output signal 119 from the PSK modulator has a spectrum 1120, symmetrical about the sub-carrier frequency $F_s$.

Transmitted signals are received by an aerial AE and after detection by a radio receiver 121 the signal are then connected to a Doppler/frequency correction circuit 123. A Doppler/frequency offset detector 124, including in-phase and quadrature signal detection, is connected to the correction circuit 123 to provide Doppler corrected signals. These signals are connected to a Fast Fourier Transform (FFT) circuit 125 operating at the sub-carrier frequency $F_s$. The FFT 125 has a number of frequency bins equal to $1/T_s$ (ie 125). The frequency bin outputs 127 are connected to a noise excision circuit 128 which operates as described with reference to FIGS. 7–9. Frequency bins symmetrical about the sub-carrier frequency $F_s$ are compared and where the power difference is greater than 10 dB (say) the larger frequency bin is excised. After noise excision the signals 129 are connected to a bank 1210 of thirty-two cross correlators, as described with reference to FIG. 9, where cross correlation products are computed for the Fourier transformed signal with each one of code set store (1211) of the thirty-two Fourier transformed pseudo-orthogonal codes. The outputs from the Fourier cross correlators are inverse Fourier transformed, providing the impulse response of each cross correlation. The maximum measured peak-to-rms noise in each output is then taken to be the received code. The code output 1212 is then connected to a symbol decoding circuit 1213. The decoded data output 1214 is connected via a control data circuit 1215, where link control data (1216) is extract, to a de-multiplexer 1217 providing eight parallel 75 bits/sec output channels 1218.

Figure 13:
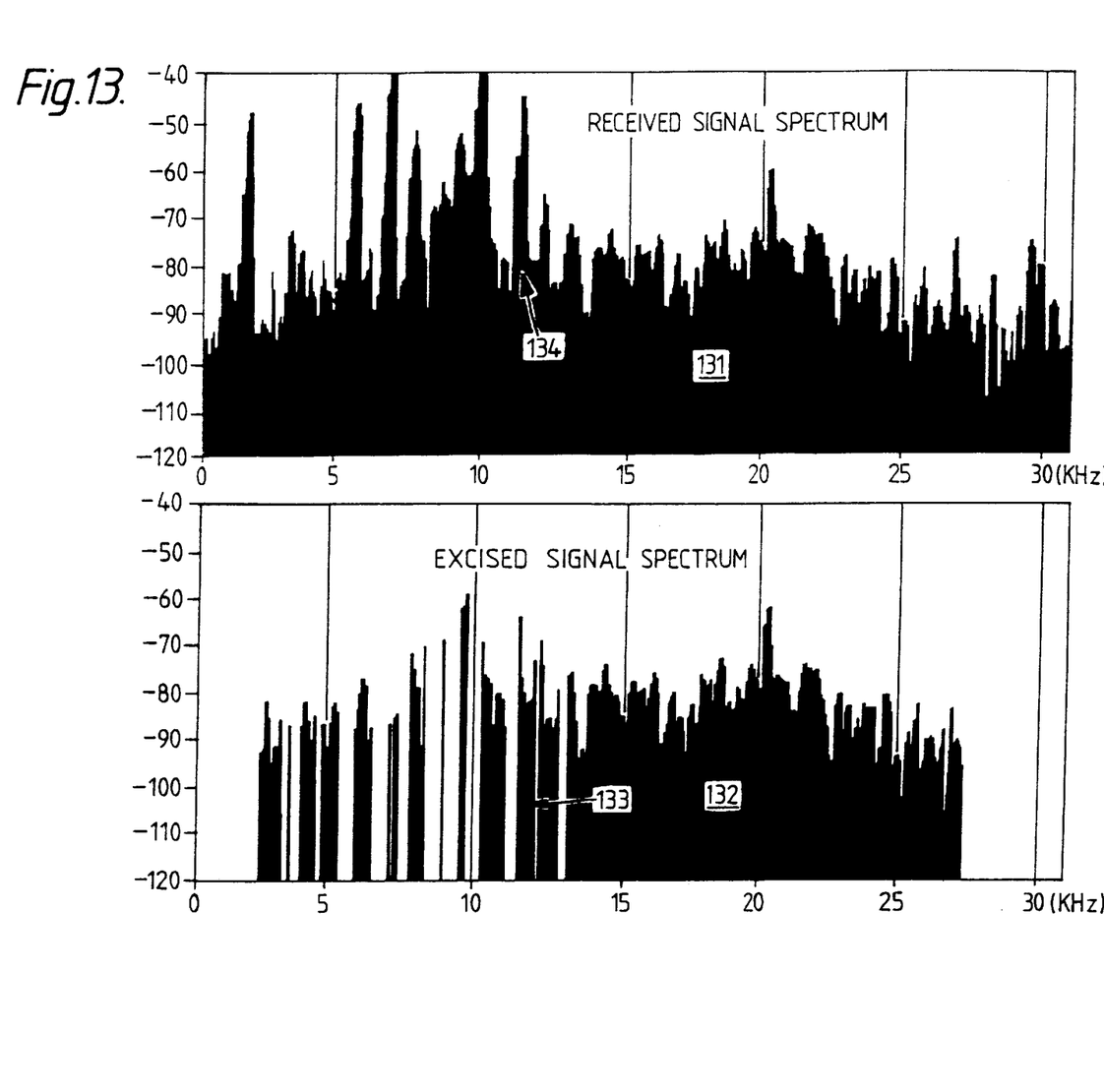
FIG. 13 shows measured frequency spectra of the received Fourier transformed signal before and after interference excision.

FIG. 13 shows measurement of the Fourier transformed received spectrum before frequency excision (131) and after excision (132). The results shown are for a system using a sub-carrier frequency of 15 kHz with simultaneous transmission of two codes from a 33 code set. As can be seen, the excised signal spectrum has noise signals below 2 kHz and above 28 kHz removed and notches 133, for example, replace identified interference 134.

Figure 14:
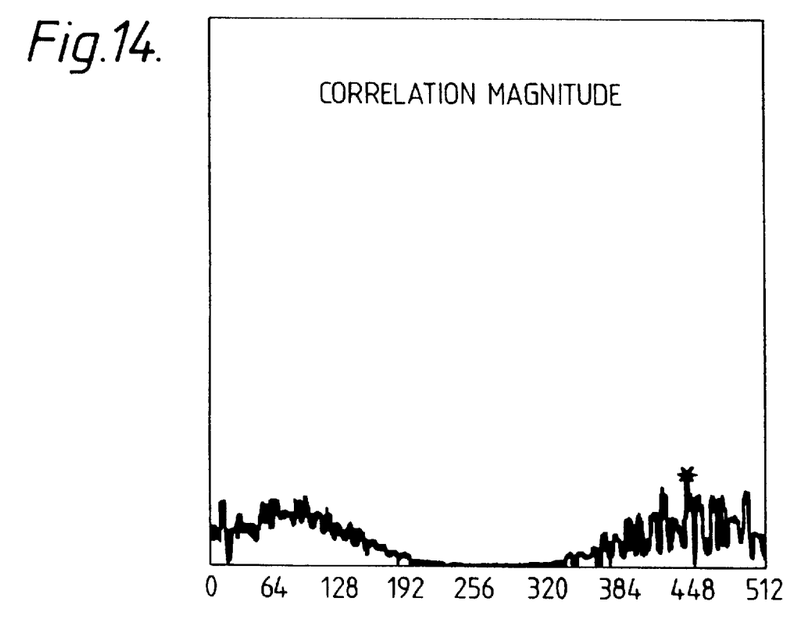
FIG. 14 is a graph of the correlation magnitude for each of 512 cross correlation points without interference excision.
Figure 15:
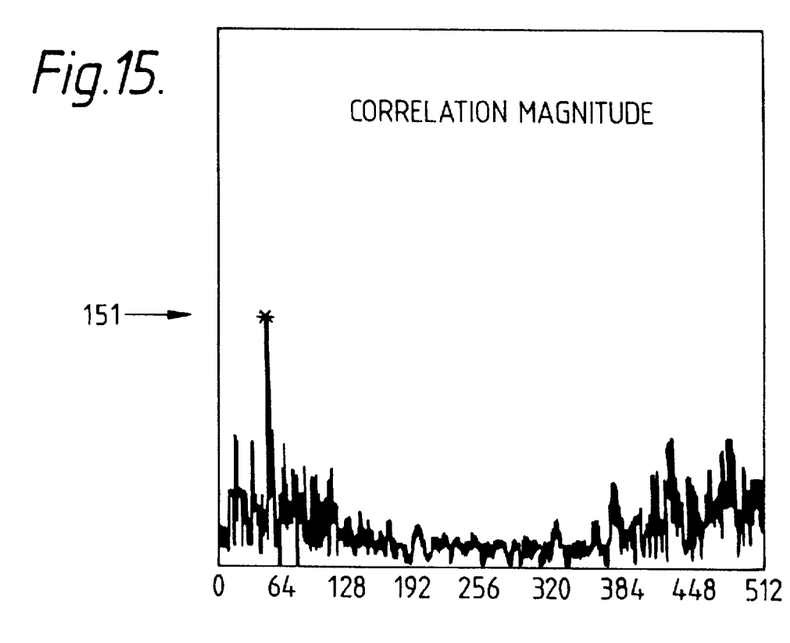
FIG. 15 is similar to FIG. 14 including interference excision.

FIG. 14 shows the result of cross correlation code identification without frequency excision ie by trying to identify the transmitted codes in the received signal spectrum 131. The graph shows correlation magnitude against a time base (1–512). The circuitry has identified the maximum correlation magnitude corresponding to a time of about 448 and this is in error. FIG. 15 shows a similar graph of the same data but after interference excision (132). In this graph the correct correlation magnitude is enhanced with respect to FIG. 14 and the receiver has been able to clearly and correctly identify the proper peak position (151).

The arrangement previously described uses a set of 32 pseudo-orthogonal codes and requires 32 cross correlators. Codes are transmitted sequentially and each code represents 5 bits of data ($2^5=32$). By using a larger family of pseudo-orthogonal codes, 512 say, each code then represents more data—9 bits in this example—and greater data rates are possible (1125 bps). This would of course require 512 cross correlators and add considerably to the circuit complexity. An alternative approach to greater data rates is to transmit more than one code at a time. For example, by selecting a set of 33 codes and transmitting 2 at a time the number of possible combinations is 528, as given by the formula:

$$\frac{N!}{X!(N-X)!}$$

where

N is the total number of codes

X is the number of simultaneously transmitted codes

Thus this code transmission arrangement can be used to represent 9 bits of data. Hence for each two code transmission 9 bits of data are sent. There is however a transmitting power penalty in an increase of the peak-to-mean ratio because two codes must be transmitted simultaneously.

To minimise the peak to mean power ratio of the transmitted signal (for two signals this will be about 6 dBs) the two codes could be sent on orthogonal rf signals ie on sine and cosine carriers. A simpler hardware arrangement for providing transmission of 9 bits of data per code transmission is possible by simultaneous transmission of 5 codes selected from a family of 12 pseudo-orthogonal codes. By using a smaller code set the cross correlation and auto correlation functions can be improved for each code and so the deterioration in the peak-to-mean $T_x$ performance is smaller than it would otherwise be. This combinational approach can increase the power of the system. It has been found that correlation in the frequency domain as described is more effective than time domain correlation in terms of hardware. Time domain correlation could of course be used by carrying out inverse Fourier transformation after interference and prior to correlation. Excising frequency bins in the interference exciser as described is found to be a very effective process. The power ratio threshold for frequency excision can be made adjustable so as to maximize the performance of the system. It is also possible to make use of phase information in symmetrical bins to normalise a frequency bin in which interference is detected.

Ideally, the spreading code signal should be received as 25 kHz USB, but 3 kHz USB reception should be possible although performance will be slightly worse because interference excision will be limited and multipath resolution much poorer. With additional circuit complexity the broadcast circuit can be improved to support a much higher data rate, with perhaps only a marginal reduction in performance. Sets of pseudo-orthogonal codes can already be created which could increase the data rate to much more than 1125 bits/sec.

What is claimed is:

1. A multichannel high frequency (hf) communications system comprising a spread spectrum signal transmitter including:
   a) means to encode a message signal by selection of at least one of a preselected number of pseudo-orthogonal binary codes:
   b) means to modulate a hf carrier wave with the encoded signal; and
   c) means to transmit the modulated hf signal, said modulated hf signal having a signal frequency spectrum symmetrical about a carrier frequency; and a receiver including:
   a) means for detecting the received modulated hf signal;
   b) means for Fourier transforming the received signal using a fast Fourier Transform (FFT) processor for producing a multiplicity of frequency channels;
   c) means for excising any narrow frequency band interference comprising means for comparing signal components in selected ones of the frequency channels symmetrically placed with respect to said carrier and for excising any channel components with an amplitude greater by a predetermined amount than the amplitude of a symmetrical channel component; and
   d) cross-correlation matched filter detection means for decoding the Fourier transformed signal to derive the original message signal.

2. A multichannel high frequency (hf) communications system as claimed in claim 1 wherein the threshold for interference excision can be made adjustable to maximise system performance.

3. A multichannel high frequency (hf) communications system as claimed in claim 2 wherein the transmitter includes a data multiplexer capable of multiplexing a number of parallel data channels, the multiplexer being connected to the input of the encoding means.

4. A multichannel high frequency (hf) communications system as claimed in claim 3 wherein channel synchronisation, data control and checking information is added to the multiplexed data connected to the encoding means.

5. A multichannel high frequency (hf) communications system as claimed in claim 4 wherein the coded data is low pass filtered and then connected to a PSK modulator to modulate a sub-carrier signal of the same frequency as the output bit rate from the encoding means.

6. A multichannel high frequency (hf) communications system as claimed in claim 5 wherein the low pass filter is an impulsive response Kaiser Bessel filter.

7. A multichannel high frequency (hf) communications system as claim in claim 6 wherein the receiver includes means to correct the received signals for Doppler frequency shift and to detect the sub-carrier signal.

8. A multichannel high frequency (hf) communications system as claimed in claim 7 wherein the matched filter detector comprises synchronous detectors to which the sub-carrier signal is respectively connected in phase quadrature.

9. A multichannel high frequency (hf) communications system as claimed in claim 8 wherein the synchronously detected signal is connected in parallel to a plurality of cross-correlation detectors, each cross-correlation detector having stored therein a respective one of the preselected number of Fourier transformed pseudo-orthogonal codes.

10. A multichannel high frequency (hf) communications system as claimed in claim 9 wherein the outputs of each cross-correlation detector is connected to a comparator circuit which identifies and decodes the most likely detected code by measurement of the largest cross-correlator output signal.

11. A multichannel high frequency (hf) communications system as claimed in claim 10 wherein phase information on symmetrically compared signal frequency components is also be used for interference excision.

12. A multichannel high frequency (hf) communications system as claimed in claim 1 wherein the interference excision means comprises means to compare signal frequency components symmetrically placed with respect to the carrier frequency and to assign a low weight to any such component whose amplitude exceeds the amplitude of the respective symmetrical component by more than a predetermined limit.

13. A multichannel high frequency (hf) communications system as claimed in claim 12 wherein the threshold for interference excision can be made adjustable to maximise system performance.

14. A multichannel high frequency (hf) communications system as claimed in claim 13 wherein the transmitter includes a data multiplexer capable of multiplexing a number of parallel data channels, the multiplexer being connected to the input of the encoding means.

15. A multichannel high frequency (hf) communications system as claimed in claim 14 wherein channel synchronisation, data control and checking information is added to the multiplexed data connected to the encoding means.

16. A multichannel high frequency (hf) communications system as claimed in claim 15 wherein the coded data is low pass filtered and then connected to a PSK modulator to modulate a sub-carrier signal of the same frequency as the output bit rate from the encoding means.

17. A multichannel high frequency (hf) communications system as claimed in claim 16 wherein the low pass filter is an impulsive response Kaiser Bessel filter.

18. A multichannel high frequency (hf) communications as claimed in claim 17 wherein the receiver includes means to correct the received signals for Doppler frequency shift and to detect the sub-carrier signal.

19. A multichannel high frequency (hf) communications system as claimed in claim 18 wherein the matched filter detector comprises synchronous detectors to which the sub-carrier signal is respectively connected in phase quadrature.

20. A multichannel high frequency (hf) communications system as claimed in claim 19 wherein the synchronously detected signal is connected in parallel to a plurality of cross-correlation detectors, each cross-correlation detector having stored therein a respective one of the preselected number of Fourier transformed semi-orthogonal codes.

21. A multichannel high frequency (hf) communications system as claimed in claim 20 wherein the outputs of each cross-correlation detector is connected to a comparator circuit which identifies and decodes the most likely detected code by measurement of the largest cross-correlator output signal.

22. A multichannel high frequency (hf) communications system as claimed in claim 21 wherein phase information on symmetrically compared signal frequency components is also be used for interference excision.

23. A multi-channel high frequency (hf) communication systems comprising a spread spectrum signal transmitter and a receiver, said signal transmitter including:

means for encoding a message signal by selection of at least one of a preselected number of pseudo-orthogonal binary codes;

means for modulating an hf carrier wave with said encoded signal; and means for transmitting said modulated hf signal, said modulated hf signal having a signal frequency spectrum symmetrical about a carrier frequency; and said receiver including:

means for detecting received modulated hf signals;

means for Fourier transforming said received signal, said means for transforming comprising a fast Fourier Transform (FFT) processor for producing a multiplicity of frequency channels; and means for excising narrow band interference signals, said excising means comprising means for comparing signal components in selected ones of the frequency channel symmetrically placed with respect to said carrier frequency and for excising any channel component with an amplitude greater by a predetermined amount than the amplitude of a symmetrical channel component.

* * * * *